US010677337B2

(12) United States Patent
Tang et al.

(10) Patent No.: US 10,677,337 B2
(45) Date of Patent: Jun. 9, 2020

(54) CONTINUOUSLY VARIABLE TRANSMISSION

(71) Applicant: WEIHAI TUANZHONG TRANSMISSION CO., LTD., Weihai (CN)

(72) Inventors: Yongfeng Tang, Weihai (CN); Yuning Tang, Weihai (CN); Yanshuai Fu, Weihai (CN)

(73) Assignee: WEIHAI TUANZHONG TRANSMISSION CO., LTD., Weihai, Shangdong Province (CN)

( * ) Notice: Subject to any disclaimer, the term of this patent is extended or adjusted under 35 U.S.C. 154(b) by 0 days.

(21) Appl. No.: 16/479,545

(22) PCT Filed: Mar. 2, 2018

(86) PCT No.: PCT/CN2018/077815
§ 371 (c)(1),
(2) Date: Jul. 19, 2019

(87) PCT Pub. No.: WO2018/210030
PCT Pub. Date: Nov. 22, 2018

(65) Prior Publication Data
US 2019/0383377 A1 Dec. 19, 2019

(30) Foreign Application Priority Data

May 16, 2017 (CN) .......................... 2017 1 0342107

(51) Int. Cl.
*F16H 47/12* (2006.01)
*F16H 47/08* (2006.01)
(52) U.S. Cl.
CPC ............. *F16H 47/12* (2013.01); *F16H 47/08* (2013.01); *F16H 2702/00* (2013.01); *F16H 2702/02* (2013.01)

(58) Field of Classification Search
CPC ...... F16H 47/08; F16H 47/12; F16H 2702/00; F16H 2702/02
(Continued)

(56) References Cited

U.S. PATENT DOCUMENTS 1,933,143 A * 10/1933 Janssen ................... F16H 33/16
475/112
3,323,390 A 6/1967 Hendrik et al.
3,334,528 A 8/1967 Hendrik

FOREIGN PATENT DOCUMENTS

CH 615004 A5 * 12/1979 ............. F16H 47/12
DE 452368 C * 11/1927 ............. F16H 47/12
(Continued)

*Primary Examiner* — Leslie A Nicholson, III
(74) *Attorney, Agent, or Firm* — Platinum Intellectual Property LLP

(57) ABSTRACT

Provided is a continuously variable transmission capable of solving a technical problem of a complex structure comprising three planetary gear sets including a planetary gear set at an input end, a planetary gear set at an output end and a bucket wheel-based planetary gear set. The continuously variable transmission comprises a planetary gear set (101) at an input end and a planetary gear set (102) at an output end. A planetary carrier (103) having a cavity is provided between the planetary gear set (101) at the input end and the planetary gear set (102) at the output end. The planetary carrier (103) comprises an input end cover (6) and an output end cover (10). The input end cover (6) is connected to an inner side of the planetary gear set (101) at the input end. The output end cover (10) is connected to an inner side of the planetary gear set (102) at the output end. A bucket-wheel housing (11) having a cavity is fixed between the input end cover (6) and the output end cover (10). A bucket-wheel (7) is fixed to a planetary gear connecting shaft (4) located inside the bucket-wheel housing (11).

4 Claims, 5 Drawing Sheets

(58) Field of Classification Search
USPC .......................................................... 475/59
See application file for complete search history.

(56) References Cited

FOREIGN PATENT DOCUMENTS

| DE | 923230 C | * | 2/1955 | ............. | F16H 47/12 |
| DE | 1295950 B | * | 5/1969 | ............. | F16H 47/12 |

* cited by examiner

CONTINUOUSLY VARIABLE TRANSMISSION

BACKGROUND OF THE INVENTION

Field of the Invention

The present invention relates to a mechanical transmission apparatus and more particularly, to a continuously variable transmission.

Description of the Related Art

In the field of transmission, transmissions are applied most widely in the automobile field. At present, automotive transmissions are classified according to manipulation manner into: manual transmission (MT), automatic transmission (AT) and manual automatic integrated transmission. With the rapid development of automobiles from day to day, the automatic transmission has gradually occupied a mainstream of the automobile due to its simple manipulation, and the automatic transmission automobile achieves the purpose of shifting by means of hydraulic transmission and gear combination. Automatic transmissions are further classified into hydraulic automatic transmission (AT), electronically controlled mechanical automatic transmission (AMT) and continuously variable transmission (CVT). Among them, the most widely applied and most loaded component is hydraulic torque converter. However, the existing transmissions universally have the following problems:

(1) In the hydraulic torque converter, the power is transmitted to a pump wheel which is connected to housing, the pump wheel agitates a fluid in the torque converter and drives, through a guide wheel, a turbine to rotate, and then the turbine outputs the power. The disadvantage thereof is that: when a difference between rotation speeds of the pump wheel and the turbine of the hydraulic torque converter is close to synchronization, transmission capacity will be lost and synchronization can't be achieved; however, when a control system is added to overcome the above existed problems of the hydraulic torque converter, it further causes problems of complicated system and high manufacturing cost.

(2) The existing continuously variable transmission (CVT) transmits power by using a transmission belt in which driving and driven wheels having variable transmission friction forces and working diameters cooperate with each other, and may achieve a continuously change of transmission ratio, thereby obtaining a best match of power train and engine working conditions. The disadvantage thereof is that: flexibly activation with zero can't be provided, a large torque can't be provided, and it tends to slip when the applied force changes frequently.

(3) Chinese Patent No. 102606709B discloses a hydraulic double-speed synchronizer, the disadvantage of which is that: the balance force between the bucket wheel and the fluid is limited, and the torque may only be changed within the maximum balance force of the fluid to the bucket wheel; the fluid in the inner casing needs to be discharged when the output shaft needs to provide a torque larger than the torque that the maximum balance force of the fluid to the bucket wheel can provide, and the gear mechanism participating in braking has a conventional structure of a planetary gear reducer which does not have a flexible transmission function; and the entire control system belongs to a electronic control system, and the structure of the apparatuses for control, braking and the like are complicated.

(4) Chinese invention application No. 201710055648.2 filed by the applicant discloses a continuously variable transmission, and the technical solution thereof is that the resistance subjected by the bucket wheel transmits a power through the bucket wheel planetary gear set. The disadvantage of this structure is that: the three planetary gear sets, namely, the input end planetary gear set, the output end planetary gear set, and the bucket wheel planetary gear set, make the structure of the device complex, and when a wide ratio of increase of torque is not required, the reduce of one planetary gear mechanism will greatly reduce the product cost and improve the reliability of the device.

SUMMARY OF THE INVENTION

The present invention is to solve the technical problem that: the three planetary gear sets including the input end planetary gear set, the output end planetary gear set, and the bucket wheel planetary gear set have a complex structure. A continuously variable transmission is provided which has a simple structure, low cost, and reliable performance and meets to the requirements of common working conditions.

To this end, the technical solution of the present invention is a continuously variable transmission including an input end planetary gear set and an output end planetary gear set, a cavity planetary gear carrier is disposed between the input end planetary gear set and the output end planetary gear set, the cavity planetary gear carrier includes a cavity input end cover and a cavity output end cover, the cavity input end cover is connected to an inward side of the input end planetary gear set, the cavity output end cover is connected to an inward side of the output end planetary gear set, and a bucket wheel cavity housing is fixedly disposed between the cavity input end cover and the cavity output end cover.

The input end planetary gear set includes an input end sun gear and input end planetary gears, the input end sun gear is engaged with the input end planetary gears, planetary gear connecting shafts are disposed in middle of the input end planetary gears, the planetary gear connecting shafts pass through the cavity input end cover and are rotatably coupled to the cavity input end cover, the planetary gear connecting shafts pass through the bucket wheel cavity housing, an input shaft is disposed in middle of the input end sun gear, the input shaft passes through the cavity input end cover and is rotatably coupled to the cavity input end cover, and the planetary gear connecting shafts pass through the cavity output end cover and are rotatably coupled to the cavity output end cover.

The output end planetary gear set includes an output end sun gear and output end planetary gears, the output end sun gear is engaged with the output end planetary gears, the output end planetary gears are fixedly connected to the planetary gear connecting shafts that pass through the cavity output end cover, and an output shaft is disposed in middle of the output end sun gear.

A portion of each of the planetary gear connecting shafts in inside of the bucket wheel cavity housing is fixedly provided with a bucket wheel.

Preferably, a number of the input end planetary gears of the input end planetary gear set is three or more.

Preferably, a number of the output end planetary gears of the output end planetary gear set is three or more.

Preferably, a portion of the input shaft in the inside of the bucket wheel cavity housing is fixedly provided with a bucket wheel.

The present invention has the effects that: since the continuously variable transmission includes an input end planetary gear set and an output end planetary gear set, a cavity planetary gear carrier is disposed between the input end planetary gear set and the output end planetary gear set, the cavity planetary gear carrier includes a cavity input end cover and a cavity output end cover, a bucket wheel cavity housing is fixedly disposed between the cavity input end cover and the cavity output end cover, an inward side of the input end planetary gear set is connected to the cavity input end cover, and an inward side of the output end planetary gear set is connected to the cavity output end cover, the device has a simple structure and a reliable performance; it is possible to realize an activation with a speed of zero and a rapid activation with no external resistance upon activation, and the transmission procedure is flexible; it is possible to realize a setting of increasing torque in multiples, the range of torque change is wide, and the rated working condition is synchronized; it is possible to realize a wide range of automatic matching of torque and speed through a self-adaptive adjustment without a control apparatus; and it is possible to be applicable in a situation of a high-power flexible transmission.

DESCRIPTION OF THE EMBODIMENTS

The present invention will be further described below in conjunction with the embodiments.

Embodiment

Figure 1:
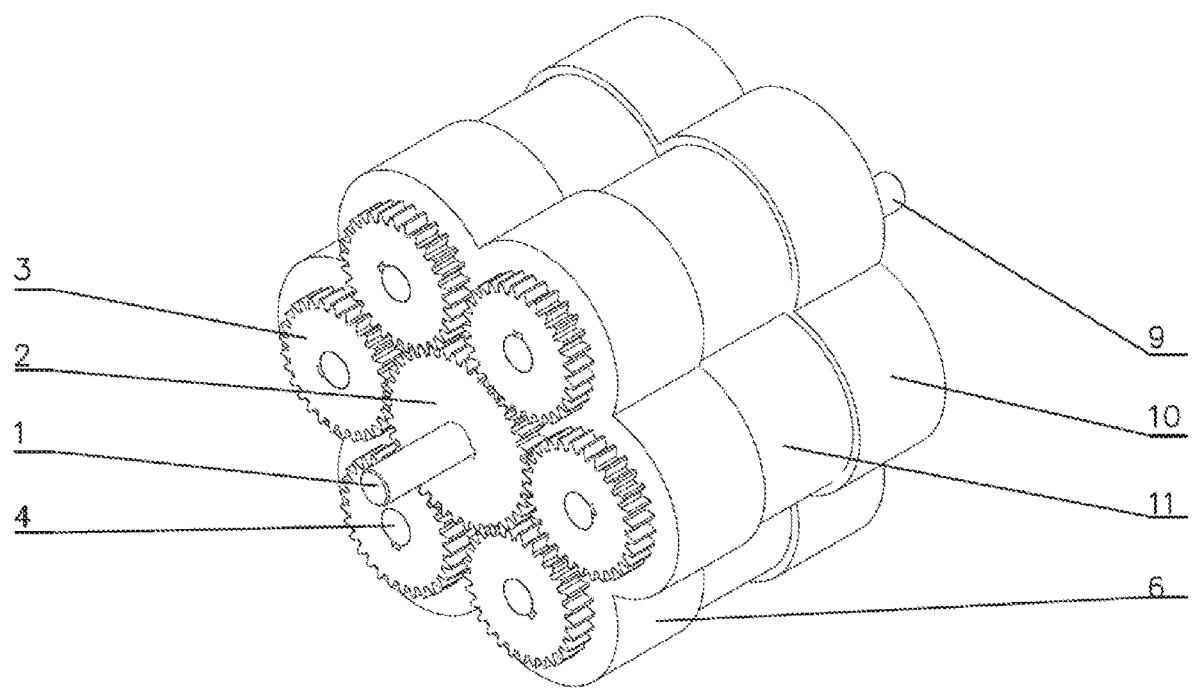
FIG. 1 is an axonometric view of an embodiment of the present invention.
Figure 2:
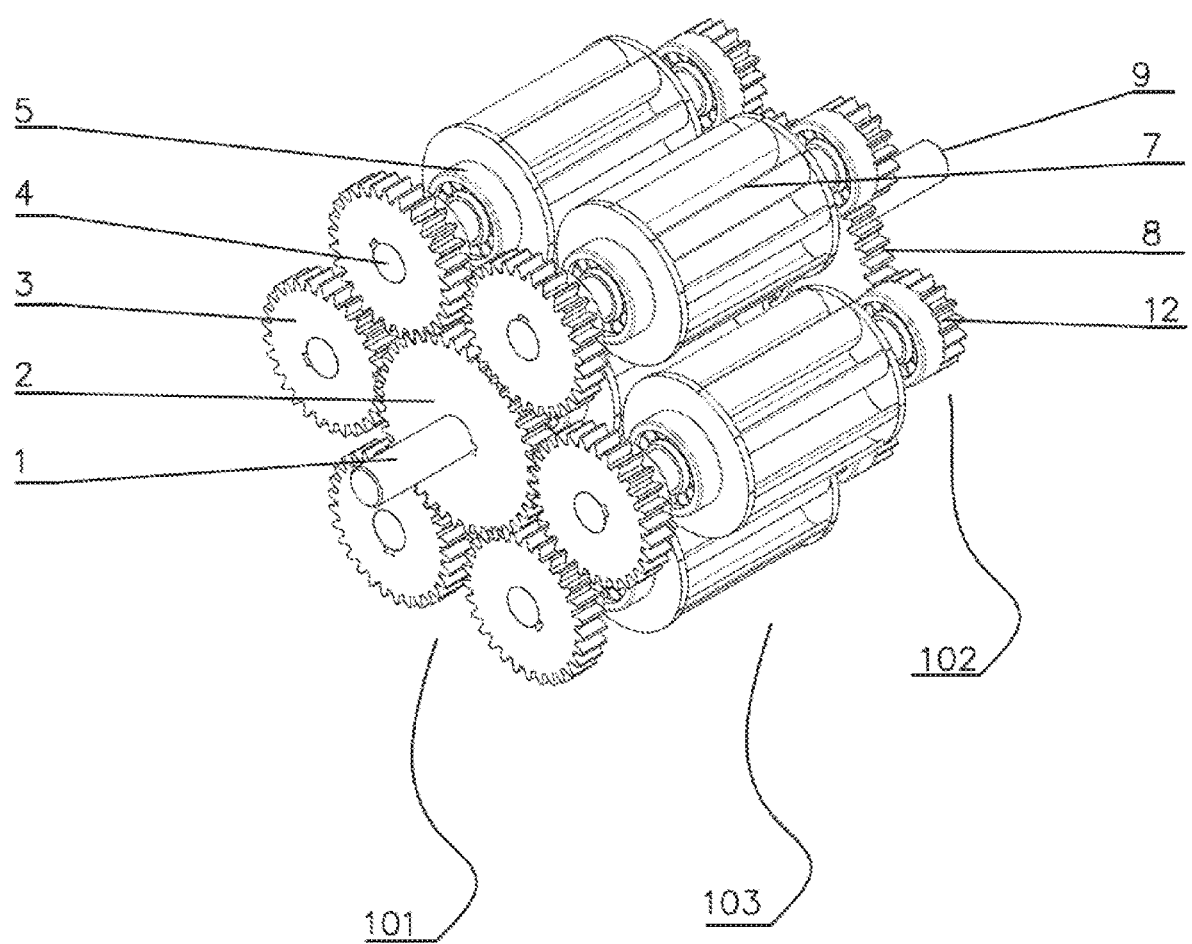
FIG. 2 is another axonometric view of the embodiment of the present invention.
Figure 3:
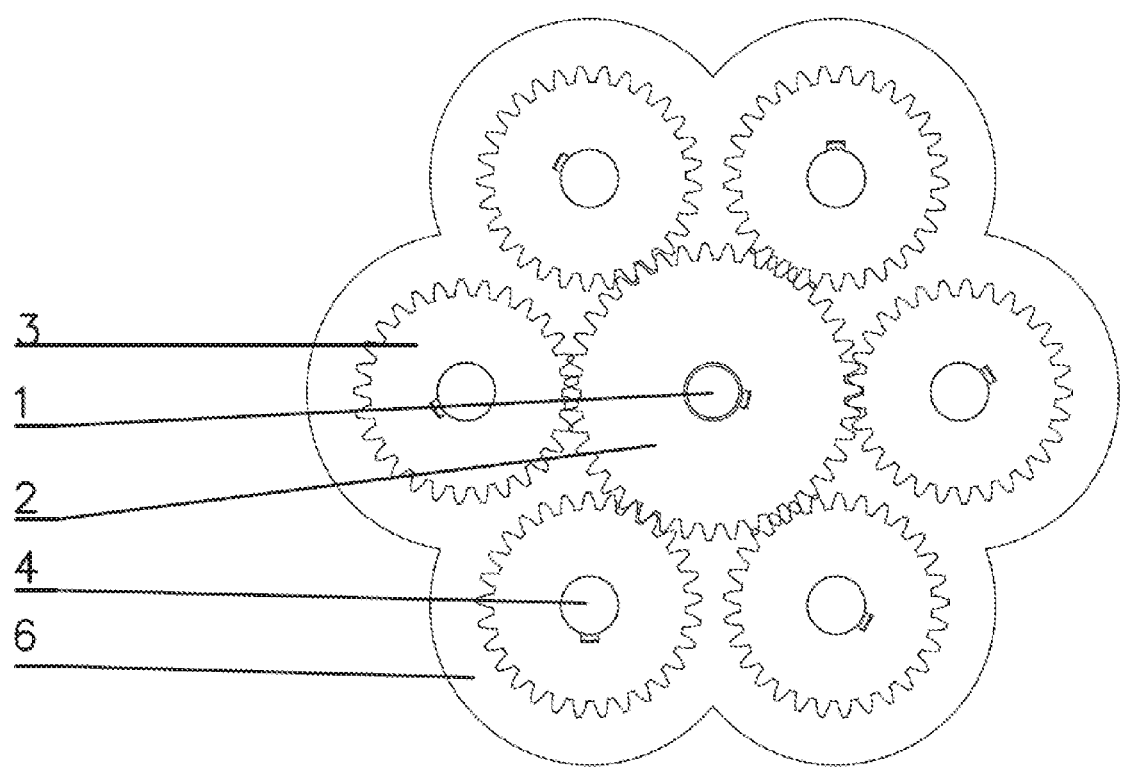
FIG. 3 is a front view of the embodiment of the present invention.
Figure 4:
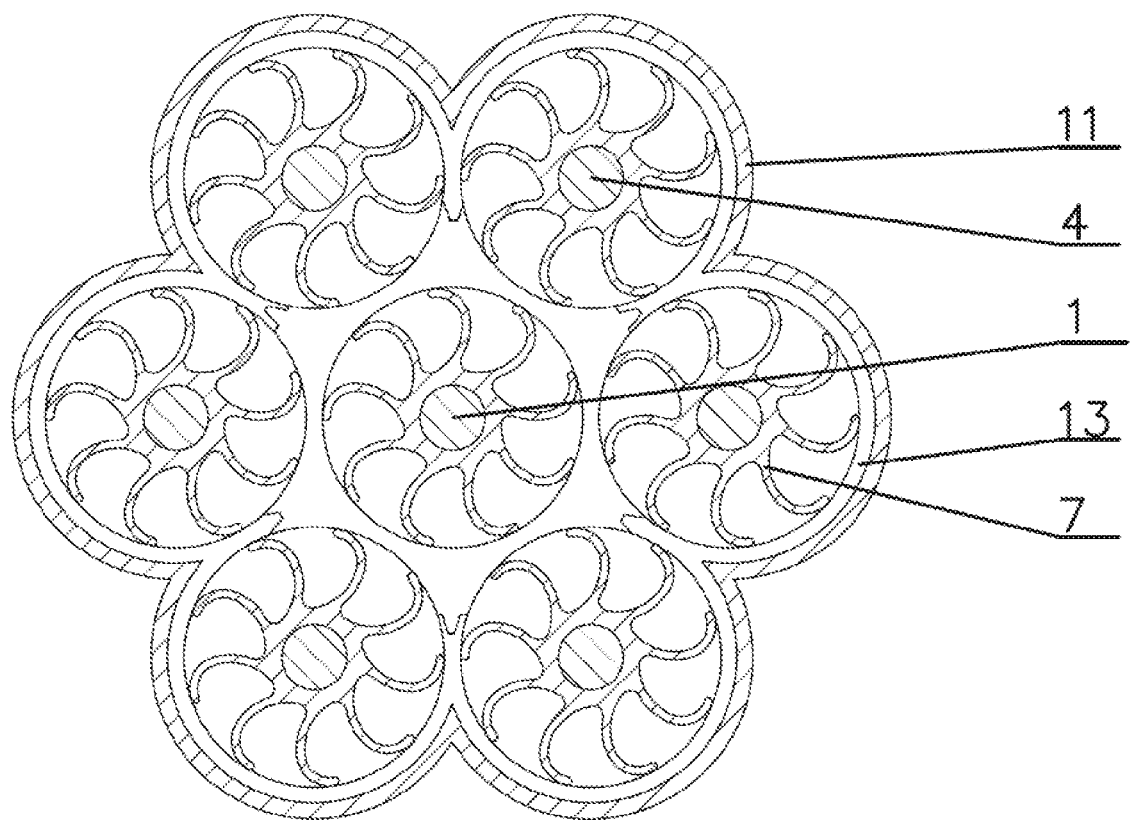
FIG. 4 is a rear view of the embodiment of the present invention.
Figure 5:
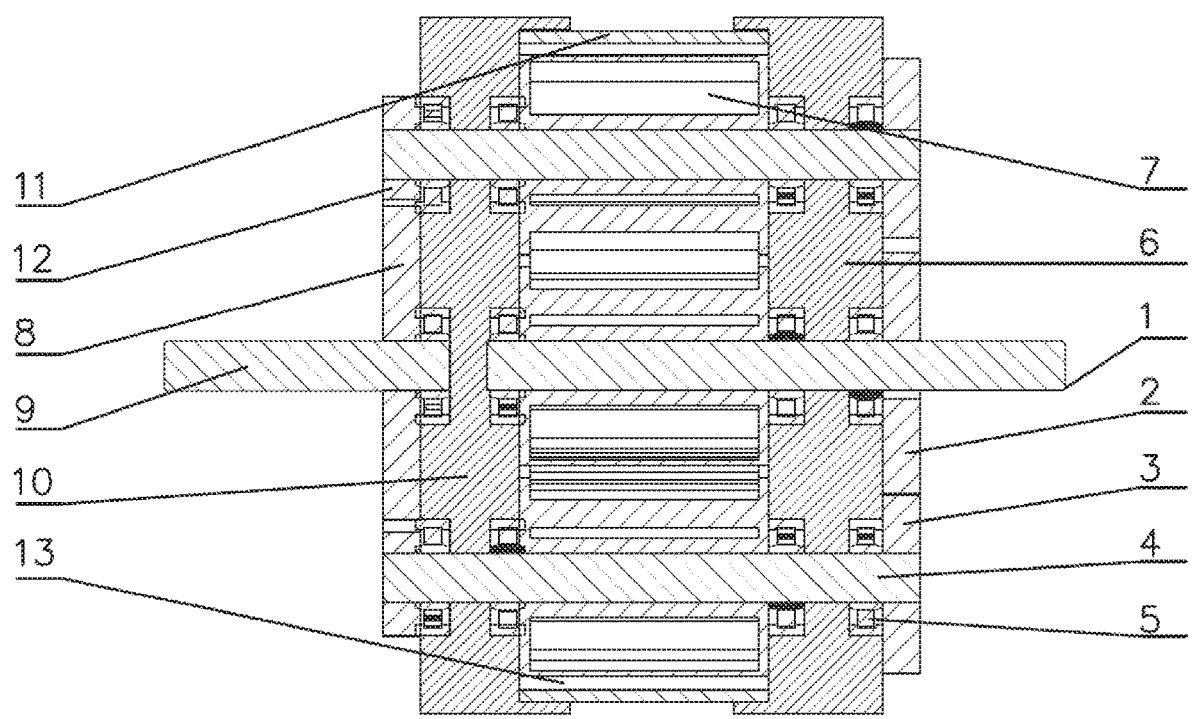
FIG. 5 is a side view of the embodiment of the present invention.
Symbols in the drawings:
1 input shaft; 2 input end sun gear; 3 input end planetary gear; 4 planetary gear connecting shaft; 5 bearing; 6 cavity input end cover; 7 bucket wheel; 8 output end sun gear; 9 output shaft; 10 cavity output end cover; 11 bucket wheel cavity housing; 12 output end planetary gear; 13 bucket wheel cavity internal fluid; 101 input end planetary gear set; 102 output end planetary gear set; 103 cavity planetary gear carrier.

FIG. 1 to FIG. 5 show a continuously variable transmission of an embodiment of the present invention, which is provided with an input end planetary gear set 101 and an output end planetary gear set 102. A cavity planetary gear carrier 103 is disposed between the input end planetary gear set 101 and the output end planetary gear set 102. The cavity planetary gear carrier 103 includes a cavity input end cover 6 and a cavity output end cover 10. A bucket wheel cavity housing 11 is fixedly disposed between the cavity input end cover 6 and the cavity output end cover 10. An inward side of the input end planetary gear set 101 is connected to the cavity input end cover 6. An inward side of the output end planetary gear set 102 is connected to the cavity output end cover 10. The input end planetary gear set 101 includes one input end sun gear 2 and six input end planetary gears 3. An input shaft 1 is disposed in middle of the input end sun gear 2. The input end sun gear 2 is engaged with the input end planetary gears 3. Planetary gear connecting shafts 4 are disposed in middle of the input end planetary gears 3. The planetary gear connecting shafts 4 pass through the cavity input end cover 6 and are rotatably coupled to the cavity input end cover 6. The planetary gear connecting shafts 4 pass through the bucket wheel cavity housing 11, and a portion of each of the planetary gear connecting shafts 4 in inside of the bucket wheel cavity housing 11 is fixedly provided with a bucket wheel 7. The input shaft 1 passes through the cavity input end cover 6 and is rotatably coupled to the cavity input end cover 6. The planetary gear connecting shafts 4 pass through the cavity output end cover 10 and are rotatably coupled to the cavity output end cover 10. The output end planetary gear set 102 includes one output end sun gear 8 and six output end planetary gears 12. An output shaft 9 is disposed in middle of the output end sun gear 8. The output end sun gear is engaged with the output end planetary gears 12. The output end planetary gears 12 are fixedly connected to the planetary gear connecting shafts 4 that pass through the cavity output end cover 10. A portion of the input shaft 1 in the inside of the bucket wheel cavity housing 11 is provided with a bucket wheel 7. An appropriate amount of bucket wheel cavity internal fluid 13 is filled in the inside of the bucket wheel cavity housing 11.

In the present embodiment, the number of teeth of the input end sun gear 2 is 39, and the number of teeth of the input end planetary gear 3 is 29; the number of teeth of the output end planetary gear 12 is 17, and the number of teeth of the output end sun gear 8 is 51. The torque output by the output shaft 9 is in a range that is 2.23 times of the torque provided by the input shaft 1.

The operation procedure is as follows. At the activation, the power is set to be input clockwise. As the power is input from the input shaft 1, the input end sun gear 2 is driven to rotate clockwise. The input end sun gear 2 drives the input end planetary gear 3 to rotate counterclockwise and further drives, through the fixedly connected planetary gear connecting shaft 4, the output end planetary gear 12 to rotate, meanwhile, the output end sun gear 8 subjects a resistance from the output shaft 9. The output end planetary gear 12 revolves counterclockwise around the output end sun gear 8 and drives the cavity planetary gear carrier 103 to revolve counterclockwise. The bucket wheel 7 that is fixed on the planetary gear connecting shaft 4 is rotated counterclockwise, and subjects a resistance of the bucket wheel cavity internal fluid 13 in the bucket wheel cavity housing 11 so as to form a torque, in which the resistance includes the fluid gravity formed by the revolution of the bucket wheel cavity housing 11, the hydraulic power formed by the injection of the fluid leaving a bucket wheel 7 to an adjacent bucket wheel 7, and the fluid adhesion force of the fluid between the bucket wheel 7 and the bucket wheel cavity housing 11. The torque is transferred to the input end sun gear 2 and the output end sun gear 8 through the planetary gear connecting shaft 4. At the same time, this torque is transferred to the cavity planetary gear carrier 103 and forms a torque that prevents the cavity planetary gear carrier 103 from revolving, and further drives the output end planetary gear 12 to against force from the output end sun gear 8, thereby the output end sun gear 8 drives the output shaft 9 to output power. The resistance of the bucket wheel cavity internal fluid 13 to the bucket wheel 7 is 0 at the beginning, and as the rotation speed of the input shaft 1 increases, the resistance of the bucket wheel cavity internal fluid 13 to the bucket wheel 7 increases in multiples, thereby the output end sun gear 8 drives the output shaft 9 to rotate so as to output power through the output shaft 9.

During the above procedure: at the beginning of the activation, the continuously variable transmission of the present embodiment is free from the external resistance and activates with a speed of zero; in the middle of the activation, the resistance subjected by the combination of the bucket wheels 7 is rapidly increased, and finally, the output end planetary gear 12 drives, through the output end sun gear 8, the output shaft 9 to flexibly activate; in the rated working condition, the speed and the torque are stable with respect to each other, and since the forces subjected by the bucket wheel 7 are balanced, the bucket wheel 7 does not rotate around itself and the wheels do not rotate with respect to each other, thereby the synchronous transmission of power is realized as a whole, approaching a transmission having a ratio 1:1; the torque is automatically adjusted to be balanced with the speed when the forces are unbalanced, and the torque output by the output shaft 9 of the continuously variable transmission of the present embodiment is in a range that is 2.23 times of the maximum torque provided by the input shaft 1.

Upon activation, the fluid in a bucket wheel 7 is impacted to another bucket wheel 7 adjacent to the bucket wheel 7 by the driving of a centrifugal force so as to form a hydraulic power, and the formula for the hydraulic power is $F=m\omega^2 r$. Compared with the technical solution in the invention application No. 201710055648.2, in the present embodiment, the bucket wheel 7 is directly disposed on the portion of the planetary gear connecting shaft 4 in the inside of the bucket wheel cavity housing 11, and the bucket wheel planetary gear set is cancelled, and thereby, the structure is simpler and the reliability is higher.

The number of teeth of the input end sun gear 2 and the number of teeth of the input end planetary gear 3 as well as the transmission ratio of other transmission pairs may be modified according to the needs of different application fields, so as to optimally adjust the amount of the required torque and achieve the output of various speeds and torques.

The above is only the specific embodiments of the present invention, and the scope of the present invention is not limited thereto, and thus all of the replacement of the equivalent components thereof, or the equivalent changes and modifications made according to the claimed scope of the present invention should still fall within the scope encompassed by the claims of the present invention.

The invention claimed is:

1. A continuously variable transmission, comprising an input end planetary gear set and an output end planetary gear set, a cavity planetary gear carrier is disposed between the input end planetary gear set and the output end planetary gear set, wherein the cavity planetary gear carrier includes a cavity input end cover and a cavity output end cover, the cavity input end cover is connected to an inward side of the input end planetary gear set, the cavity output end cover is connected to an inward side of the output end planetary gear set, and a bucket wheel cavity housing is fixedly disposed between the cavity input end cover and the cavity output end cover;

the input end planetary gear set includes an input end sun gear and input end planetary gears, the input end sun gear is engaged with the input end planetary gears, planetary gear connecting shafts are disposed in middle of the input end planetary gears, the planetary gear connecting shafts pass through the cavity input end cover and are rotatably coupled to the cavity input end cover, the planetary gear connecting shafts pass through the bucket wheel cavity housing, an input shaft is disposed in middle of the input end sun gear, the input shaft passes through the cavity input end cover and is rotatably coupled to the cavity input end cover, and the planetary gear connecting shafts pass through the cavity output end cover and are rotatably coupled to the cavity output end cover;

the output end planetary gear set includes an output end sun gear and output end planetary gears, the output end sun gear is engaged with the output end planetary gears, the output end planetary gears are fixedly connected to the planetary gear connecting shafts that pass through the cavity output end cover, and an output shaft is disposed in middle of the output end sun gear; and a portion of each of the planetary gear connecting shafts in inside of the bucket wheel cavity housing is fixedly provided with a bucket wheel.

2. The continuously variable transmission according to claim 1, wherein a number of the input end planetary gears of the input end planetary gear set is three or more.

3. The continuously variable transmission according to claim 1, wherein a number of the output end planetary gears of the output end planetary gear set is three or more.

4. The continuously variable transmission according to claim 1, wherein a portion of the input shaft in the inside of the bucket wheel cavity housing is provided with a bucket wheel.

\* \* \* \* \*